United States Patent
Zhao

(10) Patent No.: US 12,350,614 B2
(45) Date of Patent: Jul. 8, 2025

(54) FILTERING DEVICE, GENERATOR AND WIND TURBINE GENERATOR SYSTEM

(71) Applicant: BEIJING GOLDWIND SCIENCE & CREATION WINDPOWER EQUIPMENT CO., LTD., Beijing (CN)

(72) Inventor: Jiangwei Zhao, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 439 days.

(21) Appl. No.: 17/780,929

(22) PCT Filed: Aug. 25, 2020

(86) PCT No.: PCT/CN2020/111087
§ 371 (c)(1),
(2) Date: May 27, 2022

(87) PCT Pub. No.: WO2021/103685
PCT Pub. Date: Jun. 3, 2021

(65) Prior Publication Data
US 2022/0410055 A1      Dec. 29, 2022

(30) Foreign Application Priority Data
Nov. 28, 2019   (CN) .......................... 201911192768.2

(51) Int. Cl.
*B01D 46/00*   (2022.01)
*B01D 46/10*   (2006.01)
(Continued)

(52) U.S. Cl.
CPC ......... *B01D 46/0002* (2013.01); *B01D 46/10* (2013.01); *B01D 46/30* (2013.01);
(Continued)

(58) Field of Classification Search
CPC .................................................. B01D 2279/45
See application file for complete search history.

(56) References Cited

U.S. PATENT DOCUMENTS 5,766,285 A * 6/1998 Killman ............. B01D 46/0016
                                                                 55/501
8,834,592 B1   9/2014 Dimicelli
(Continued)

FOREIGN PATENT DOCUMENTS

CN    103347585 A   10/2013
CN    204099134 U    1/2015
(Continued)

OTHER PUBLICATIONS

Australian Examination Report in related Australian Application No. 2020390718 dated Mar. 20, 2024 (4 pages).
(Continued)

*Primary Examiner* — Gabriel E Gitman
(74) *Attorney, Agent, or Firm* — BAYES PLLC

(57) ABSTRACT

A filtering device, a generator and a wind turbine generator system are provided. The filtering device comprises a force-bearing cover plate, a surrounding plate, a first filter screen structure, a second filter screen structure and a filter cartridge; the force-bearing cover plate and the surrounding plate enclose an accommodation space for filling the filter cartridge, the surrounding plate forming at least a part of a side wall of the accommodation space; the first filter screen structure is provided on an upper side of the filter cartridge, is located on a lower side of the force-bearing cover plate, and substantially covers an upper side surface of the filter cartridge; and the second filter screen structure is provided at a lower side of the filter cartridge, and covers a lower side surface of the filter cartridge.

20 Claims, 5 Drawing Sheets

(51) Int. Cl.

| | | |
|---|---|---|
| *B01D 46/30* | (2006.01) | |
| *B01D 46/62* | (2022.01) | |
| *B01D 46/88* | (2022.01) | |
| *H02K 7/18* | (2006.01) | |
| *H02K 9/26* | (2006.01) | |
| *F03D 80/60* | (2016.01) | |

(52) U.S. Cl.
 CPC .......... *B01D 46/645* (2022.01); *B01D 46/88* (2022.01); *H02K 7/1838* (2013.01); *H02K 9/26* (2013.01); *B01D 2265/06* (2013.01); *F03D 80/60* (2016.05)

(56) References Cited

U.S. PATENT DOCUMENTS

| | | |
|---|---|---|
| 2010/0269467 A1 | 10/2010 | Crabtree et al. |
| 2019/0140518 A1* | 5/2019 | Groenheden ............ H02K 9/04 |
| 2019/0224607 A1 | 7/2019 | Bergami |

FOREIGN PATENT DOCUMENTS

| | | |
|---|---|---|
| CN | 107441880 A | 12/2017 |
| CN | 206753832 U | 12/2017 |
| CN | 206881357 U | 1/2018 |
| CN | 108778459 A | 11/2018 |
| CN | 208073685 U | 11/2018 |
| CN | 109347254 A | 2/2019 |
| EP | 0350192 A1 | 1/1990 |
| KR | 20050049897 A | 5/2005 |
| KR | 101291664 B1 | 8/2013 |
| WO | 2008103736 A1 | 8/2008 |
| WO | 2019096360 A1 | 5/2019 |

OTHER PUBLICATIONS

International Search Report in corresponding PCT Application No. PCT/CN2020/111087 dated Nov. 17, 2020 (11 pages).
Extended European Search Report in related European Application No. 20893815.9 dated Dec. 9, 2022 (7 pages).

* cited by examiner

FILTERING DEVICE, GENERATOR AND WIND TURBINE GENERATOR SYSTEM

CROSS-REFERENCE TO RELATED APPLICATIONS

This application is the national phase of International Application No. PCT/CN2020/111087, filed on Aug. 25, 2020, which claims the priority to Chinese Patent Application No. 201911192768.2, filed on Nov. 28, 2019. The entire contents of each of the above-identified applications are expressly incorporated herein by reference.

TECHNICAL FIELD

The present disclosure relates to the technical field of wind power, and in particular to a filtering device, generator and wind turbine generator system.

BACKGROUND

When a wind turbine generator system is running, a rotor and a stator of a generator will generate a lot of heat. In order to avoid excessive heat accumulation, which may cause damage to the generator, economical air cooling is generally adopted in the conventional technology. Specifically, a generator cooling air inlet is provided on the generator housing to form heat dissipation flow passages that communicates the environment inside the generator housing with the environment outside the generator housing. In order to reduce or prevent dust particles in the air from entering the generator housing with the wind, thereby affecting the generator, a filter screen is generally provided at the generator cooling air inlet of the generator housing in the conventional technology. Specifically, the filter screen is directly connected with the generator housing and covers the generator cooling air inlet, which has the disadvantage of a poor filtering performance.

In addition, with the upsizing of the wind turbine generator system, for example, the size of equipment such as a nacelle and a generator has become larger and larger. In the operation and maintenance of the wind turbine generator system, an operator often needs to rely on a climbing assistive device such as a ladder to perform an operation at a high position, and there are disadvantages of excessive types of operation and maintenance tools and a heavy burden on the operator.

SUMMARY

In view of the disadvantages of the existing solutions, a filtering device, generator and wind turbine generator system are provided to at least solve the problems in the conventional technology of a poor performance of the filter structure of the generator cooling air inlet, or high cost caused by excessive use of load-bearing members made by casting or stamping, or a complicated process of mounting the filter element (filter cotton), or excessive types of operation and maintenance tools, or a heavy burden on the operator.

In the first aspect, a filtering device is provided according to the embodiments of the present disclosure, which includes a load-bearing cover plate, an enclosure plate, a first filter screen structure, a second filter screen structure, and a filter element.

The load-bearing cover plate and the enclosure plate define an accommodation space for filling the filter element, wherein the enclosure plate forms at least part of a side wall of the accommodation space.

The first filter screen structure is arranged above the filter element and below the load-bearing cover plate, and substantially covers an upper surface of the filter element.

The second filter screen structure is arranged below the filter element, and covers a lower surface of the filter element.

In addition, a filter element mounting hole, a filter element pushing hole and a hollow portion are provided on the load-bearing cover plate, which ensures that the cover plate bears the bear-loading structural components, while minimizing the area of the cover plate and reducing the manufacturing cost of the load-bearing cover plate.

In a second aspect, a generator is provided according to the embodiments of the present disclosure, which includes a generator housing with build-in rotor and stator. The generator housing has an air inlet for heat dissipation, and the filtering device according to the first aspect is provided at the air inlet.

In a third aspect, a wind turbine generator system is provided according to the embodiments of the present disclosure, which includes the filtering device according to the first aspect, or the generator according to the second aspect.

The technical solutions according to the embodiments of the present disclosure have at least the following beneficial effects.

1. The load-bearing cover plate is used for providing an operation region on the generator that can carry operators and related tools. The operators can perform operation and maintenance taking advantage of the height of the generator, reducing the types of tools required for operation and maintenance, and reducing the burden on the operators;

2. Only the rigidity of the load-bearing cover plate is required to meet the load-bearing requirements, and there is no need to increase the rigidity of the entire generator housing, which reduces the cost;

3. The filter structure supported by a double-layer filter screen and matched with the filter element forms a reliable and simple-structure filter at the generator cooling air inlet, ensuring the IP level inside the generator, which is easy to operate and maintain.

The additional aspects and advantages of the present disclosure will be further described in the following description, which will become obvious from the following description or be understood through the embodiments of the present application.

BRIEF DESCRIPTION OF THE DRAWINGS

The above and/or additional aspects and advantages of the present application will become obvious and easy to understand with reference to the following description of embodiments in conjunction with the drawings.

Figure 1:
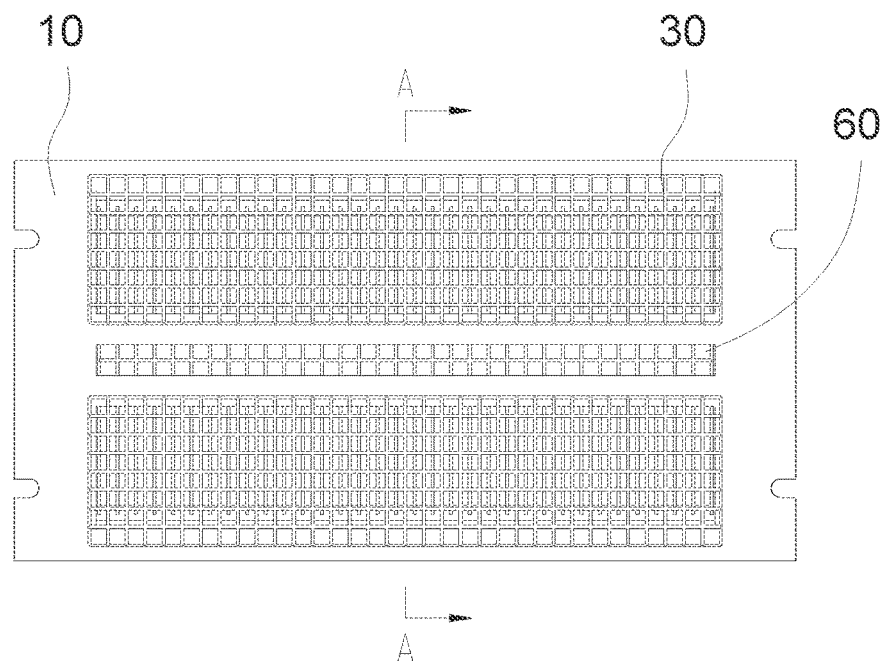
FIG. 1 is a top view of a filtering device according to a first embodiment of the present disclosure.

Reference numerals are listed as follows:

| | |
|---|---|
| 10 load-bearing cover plate; | 10a first mounting port; |
| 10b filter element pushing hole; | 10c second mounting port; |
| 10d hollow portion; | 10e filter screen port; |
| 11 first cover plate; | 12 second cover plate; |
| 20 enclosure plate; | 20a bent portion; |
| 21a first inner crimping; | 22a second inner crimping; |
| 23a first sealing edge; | 24a second sealing edge; |
| 21b first support plate; | 22b second support plate; |
| 23b first baffle; | 24b second baffle; |
| 23b1 crimping; | |
| 30 first filter mesh structure; | 40 second filter mesh structure; |
| 50 bottom plate; | |
| 60 filter element; | 70 accommodation space. |

DETAILED DESCRIPTION

The embodiments of the present disclosure are described in detail hereinafter, and are illustrated in drawings, in which the same or similar reference numerals represent the same or similar members or members with the same or similar functions throughout the description. In addition, if a detailed description of the known technology is unnecessary for the illustrated features of the present disclosure, it will be omitted. The embodiments described in the following with reference to the drawings are only exemplary embodiments which are used to explain the present disclosure, and should not be construed to limit the present disclosure.

It should be understood by those skilled in the art that all terms (including technical and scientific terms) used herein have the same meaning as commonly understood by one of ordinary skilled in the art to which the present disclosure belongs, unless otherwise defined. It should also be understood that terms such as those defined in a general dictionary have the same meaning as that in the context of the prior art unless specifically defined, and should not be interpreted in an idealized or overly formal sense.

Those skilled in the art should understand that, unless explicitly stated, the singular forms used herein such as "a", "an", "said", and "the" are intended to include the plural forms. It should be further understood that, the terms "include/comprise", when used in the description, indicate the existence of a feature and/or an element, but does not exclude the existence or addition of one or more of other features, elements, or combinations of features or elements.

The term "and/or" used herein includes all or any unit or all combinations of one or more associated listed items.

First of all, in order to introduce and explain the present disclosure clearly and accurately, and to facilitate understanding, some definitions are given below. A direction perpendicular to the plane of the load-bearing cover plate is defined as "side", and a direction parallel to the plane of the load-bearing cover plate is defined as "end". In addition, the overall shape of the load-bearing cover plate is similar to the shape of the filter element, which is cuboid. The extension direction of the longest side of the cuboid is defined as the "longitudinal direction" in the disclosure, the extension direction of the second longest side of the cuboid is defined as the "width direction" in the disclosure, and the extension direction of the shortest side of the cuboid is defined as the "thickness direction" in the disclosure.

The inventor of the present disclosure has conducted research and found that, in a wind turbine generator system that adopts air cooling, the generator housing is provided with the generator cooling air inlet, and in order to reduce or prevent dust particles in the air from affecting the generator, the filter screen is directly connected with the generator housing and covers the filter structure of the generator cooling air inlet, but this filter structure is relatively thin and has the disadvantage of a poor filtering performance.

In addition, with the upsizing of the wind turbine generator system, the size of equipment such as a nacelle and a generator has become larger and larger, and the structure or number of filtering devices has also become larger. The main load-bearing components of these filtering devices are substantially formed by casting or stamping of thicker steel plates. The use of the load-bearing steel plate with a large area or a large number makes the cost of the filtering device of the wind turbine generator system too high. Besides, in the operation and maintenance of the wind turbine generator system, the operator often needs to rely on a climbing assistive device such as a ladder to perform an operation at a high position. The heavy weight of the load-bearing components of the filtering device makes the assembling and disassembling of the existing filter element inconvenient, and there are disadvantages of excessive types of operation and maintenance tools and a heavy burden on the operator. Although the generator of a wind turbine generator system has a predetermined height, the operator and related tools cannot be supported by the generator or the filter screen due to the low rigidity of the generator housing and the filter screen, and the operator cannot take advantage of the height of the generator to perform operation and maintenance.

The filtering device, the generator and the wind turbine generator system are provided according to the present disclosure, to address the above technical issues of the conventional technology.

The technical solutions of the present application and how the technical solutions of the present application address the above technical issues will be described in detail below with specific embodiments.

A filtering device is provided according to the embodiments of the present disclosure, which improves the structural form of the load-bearing structure of the existing filtering device, and improves the structural form of the filter element mounted in the filtering device, so that the cost of the filtering device is reduced and the maintenance of the filter element is facilitated on the basis of maintaining the original various performance such as load-bearing and filtering.

A schematic structural diagram of the filtering device is as shown in FIGS. 1 to 4. The filtering device includes a load-bearing cover plate 10, an enclosure plate 20, a first filter screen structure 30, a second filter screen structure 40, and a filter element 60.

The load-bearing cover plate 10 and the enclosure plate 20 define an accommodation space 70 for filling the filter element 60, and the enclosure plate 20 forms at least part of a side wall of the accommodation space 70.

The first filter screen structure 30 is arranged above the filter element 60 and below the load-bearing cover plate 10, and substantially covers an upper surface of the filter element 60.

The second filter screen structure 40 is arranged below the filter element 60, and covers a lower surface of the filter element 60.

Figure 4:
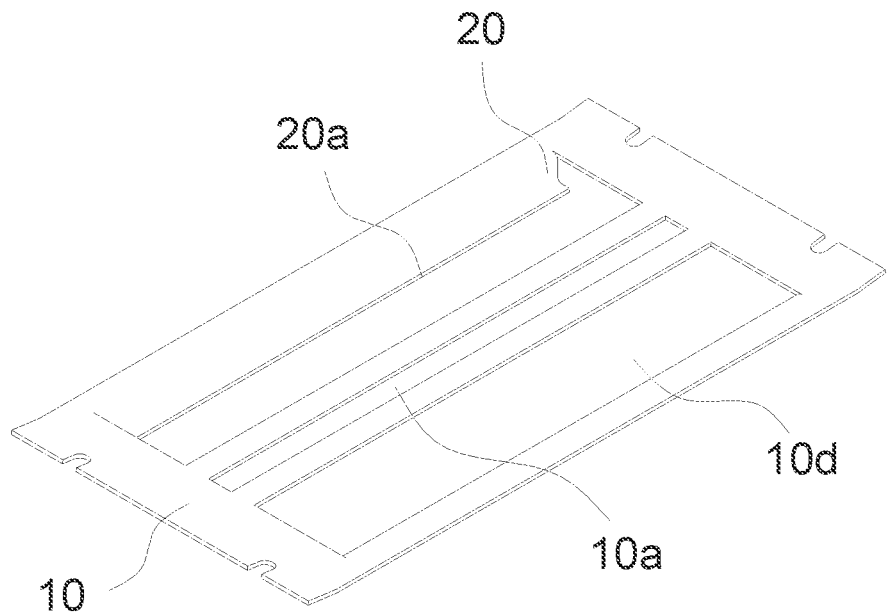
FIG. 4 is a perspective view of a load-bearing cover plate in FIG. 1.

As shown in FIG. 4, the load-bearing cover plate 10 is a load-bearing structural component of the filtering device, and is a thick steel plate or a cast iron structure. The load-bearing cover plate 10 is substantially a square plate, covering the upper surface of the filter element 60, and the middle area of the load-bearing cover plate 10 may be provided with a filter element mounting hole, a hollow portion with a large area, and so on, which can reduce the area of the load-bearing cover plate 10.

Figure 2:
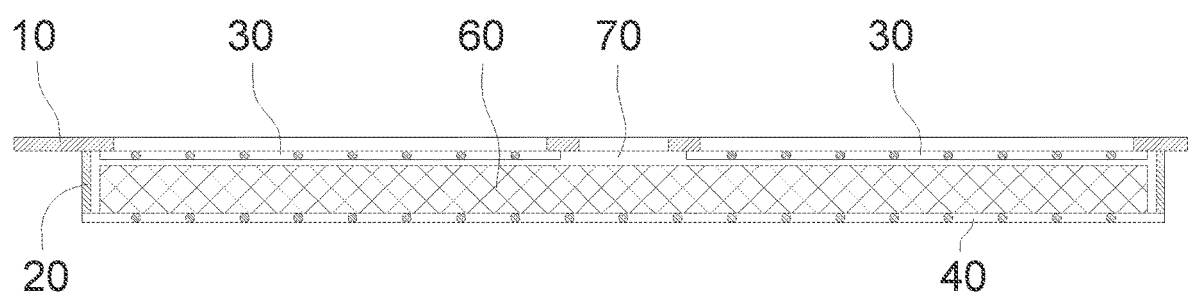
FIG. 2 is a schematic sectional view showing the structure of the filtering device of FIG. 1 taken along line A-A.
Figure 3:
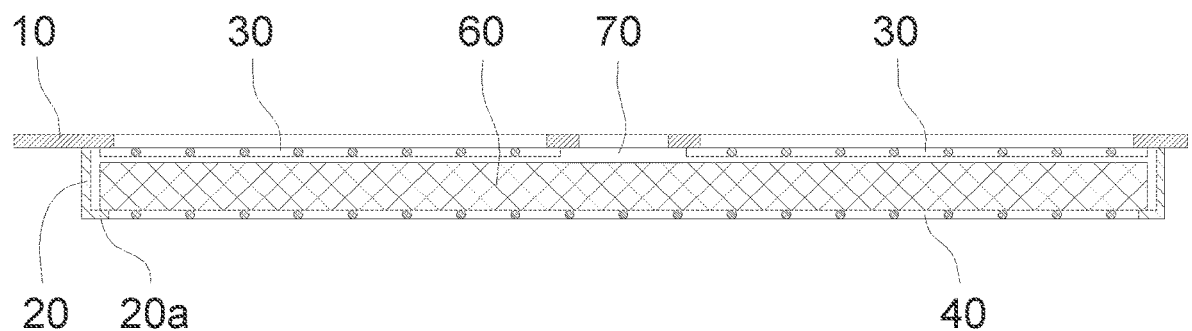
FIG. 3 is another schematic sectional view showing the structure of the filtering device of FIG. 1 taken along line A-A.

As shown in FIGS. 2 and 3, the load-bearing cover plate 10 and the enclosure plate 20 define the accommodation space 70 for filling the filter element 60. The enclosure plate 20 mainly encloses the load-bearing cover plate 10 on four sides, and the structure of the enclosure plate 20 may be configured as only including the side wall portion forming the accommodation space 70, as shown in FIG. 2, or, the structure of the enclosure plate 20 may be configured as shown in FIG. 3, that is, a bent portion 20a is formed on a lower side portion of the enclosure plate 20, and the bent portion 20a covers at least part of a lower surface of the filter element 60 to support the lower surface of the filter element 60. The first filter screen structure 30 and the second filter screen structure 40 are respectively provided on the upper and lower surfaces of the filter element 60, which cover the upper and lower surfaces of the filter element 60, and protects the exposed portion of the filter element 60 corresponding to the hollow portion 10d of the load-bearing cover plate 10 and the exposed portion of the lower surface of the filter element 60 with a predetermined degree of rigidity.

In some embodiments, the first filter screen structure 30 is arranged on the load-bearing cover plate 10, one side of the enclosure plate 20 is fixedly connected to the load-bearing cover plate 10, and the second filter screen structure 40 is fixedly connected to another side of the enclosure plate 20, the filter element 60 is arranged in the accommodation space 70 defined by the load-bearing cover plate 10, the first filter screen structure 30, the enclosure plate 20 and the second filter screen structure 40, and the filter element 60 matches with at least one cross section of the heat dissipation flow passage perpendicular to the heat dissipation direction, and the heat dissipation flow passage passes through the accommodation space 70. The filter element 60 can fill up at least one cross section of the heat dissipation flow passage to ensure the filtering function.

In some embodiments, the load-bearing cover plate 10 may be connected to a load-bearing beam of the generator.

In some embodiments, the filter element 60 includes filter cotton, or filter paper, or a polyurethane filter element and the like. The filter element 60 adopts an existing rectangular structure with a predetermined thickness to fill the accommodation space 70 and filter the fluid passing through.

In the filtering device according to the above embodiments, the load-bearing cover plate 10 is used for providing an operation region on the generator that can carry the operator and related tools. The operator can perform operation and maintenance taking advantage of the height of the generator, reducing the types of tools required for operation and maintenance, and reducing the burden on the operators. Besides, only the rigidity of the load-bearing cover plate 10 is required to meet the load-bearing requirements, and there is no need to increase the rigidity of the entire generator housing, which reduces the cost.

In the filtering device according to the above embodiments, the filter structure, which is supported by a double-layer filter screen cooperating with the filter element 60, forms a reliable and simple-structure filter at the generator cooling air inlet, ensuring the IP level inside the generator (IP is abbreviated for Ingress Protection, and the IP level is the protection level of the housing of electrical equipment against the intrusion of foreign objects, which originates from the standard IEC60529 of the International Electrotechnical Commission, and was also adopted as the American national standard in 2004), which is easy to operate and maintain.

The inventor of the present disclosure considers that, the filter element 60 in the filtering device is a consumable product, and the filter element 60 needs to be maintained or replaced regularly. An implementation manner of the filtering device according to the present disclosure is provided below.

A mounting port allowing the filter element 60 to pass through is provided in the load-bearing cover plate 10 according to the embodiment of the present disclosure. The mounting port can facilitate the removal or mounting of the filter element 60 by the operator during the maintenance process of the filtering device.

On the basis of the above embodiments, an implementation manner of the filtering device according to the present disclosure is provided below.

As shown in FIGS. 1 and 4, the filter element 60 is flexible. The mounting port of the load-bearing cover plate 10 includes a first mounting port 10a, which extends along the longitudinal direction of the load-bearing cover plate 10.

In this embodiment, the first mounting port 10a may be an elongated hole extending in the longitudinal direction of the filter element 60. The first mounting port 10a facilitates the removal and mounting of the filter element 60 in the width direction of the load-bearing cover plate 10, can further reduce the area of the hollow portion 10d of the load-bearing cover plate 10, and is conducive to maintaining the strength of the load-bearing cover plate 10. The flexible filter element during the removal and mounting can be well adapted to the first mounting port 10a.

In some embodiments, the first mounting port 10a is provided at one widthwise end of the load-bearing cover plate 10. During mounting, one end of the flexible filter element is pushed into the accommodation space 70 of the filtering device through the first mounting port 10a of the load-bearing cover plate 10 until the other end of the flexible filter element is also pushed into the accommodation space 70 of the filtering device, completing the mounting of the filter element 60.

In some embodiments, the first mounting port 10a is arranged in the widthwise middle of the load-bearing cover plate 10. During mounting, one end of the flexible filter element is pushed toward one widthwise end of the accommodation space 70 of the filtering device through the first mounting port 10a of the load-bearing cover plate 10, and the other end of the flexible filter element is pushed toward the other widthwise end of the accommodation space 70 of the filtering device through the first mounting port 10a of the load-bearing cover plate 10 until the entire flexible filter element is completely pushed into the accommodation space 70 of the filtering device, completing the mounting of the filter element 60. During the pushing process, the other end of the flexible filter element may be pushed after one end of the flexible filter element reaches the target position (for example, one end of the accommodation space 70). It is also applicable to push two ends of the flexible filter element at the same time until the flexible filter element is completely pushed into the accommodation space 70 of the filtering device.

In some embodiments, the size of the first mounting port 10a is slightly smaller than the size of a cross section of the filter element 60 perpendicular to the mounting direction, and the filter element 60 can be slightly compressed during mounting. After the mounting is completed, the filter element 60 recovers its original size. In this way, the first mounting port 10a can fix the filter element 60.

In some embodiments, as shown in FIG. 4, the load-bearing cover plate 10 further includes two hollow portions 10d, and the first mounting port 10a is arranged between the two hollow portions 10d. The first mounting port 10a is arranged in the middle of the load-bearing cover plate 10, and the hollow portion 10d with a large area is provided in the load-bearing cover plate 10 on two sides of the first mounting port 10a. The hollow portion 10d may have an elongated hole structure extending in the longitudinal direction of the filter element 60, and the width dimension of the hollow portion 10d is greater than the width dimension of the first mounting port 10a. The two hollow portions 10d may be axisymmetric with respect to the first mounting port 10a, so that the filter element 60 can be pushed into and removed from the accommodation space 70 by a small deformation.

Optionally, the first filter screen structure 30 includes two parts, which are respectively provided corresponding to the two hollow portions 10d and cover the upper surface of the filter element 60. That is, corresponding to the arrangement of the first mounting port 10a, the first filter screen structure 30 may be configured as two first filter screens 30 corresponding to the two hollow portions 10d. The two first filter screen structures 30 respectively cover the two hollow portions 10d. The portion corresponding to the first mounting port 10a is not covered as shown in FIGS. 2 and 3, so as to facilitate the insertion of the filter element 60 into the accommodation space 70 through the first mounting port 10a. This arrangement facilitates the removal and mounting of the filter element 60, can further reduce the area of the hollow portions 10d of the load-bearing cover plate 10, and is conducive to maintaining the strength of the load-bearing cover plate 10.

On the basis of the above embodiments, another implementation manner of the filtering device according to the present disclosure is provided below.

Figure 5:
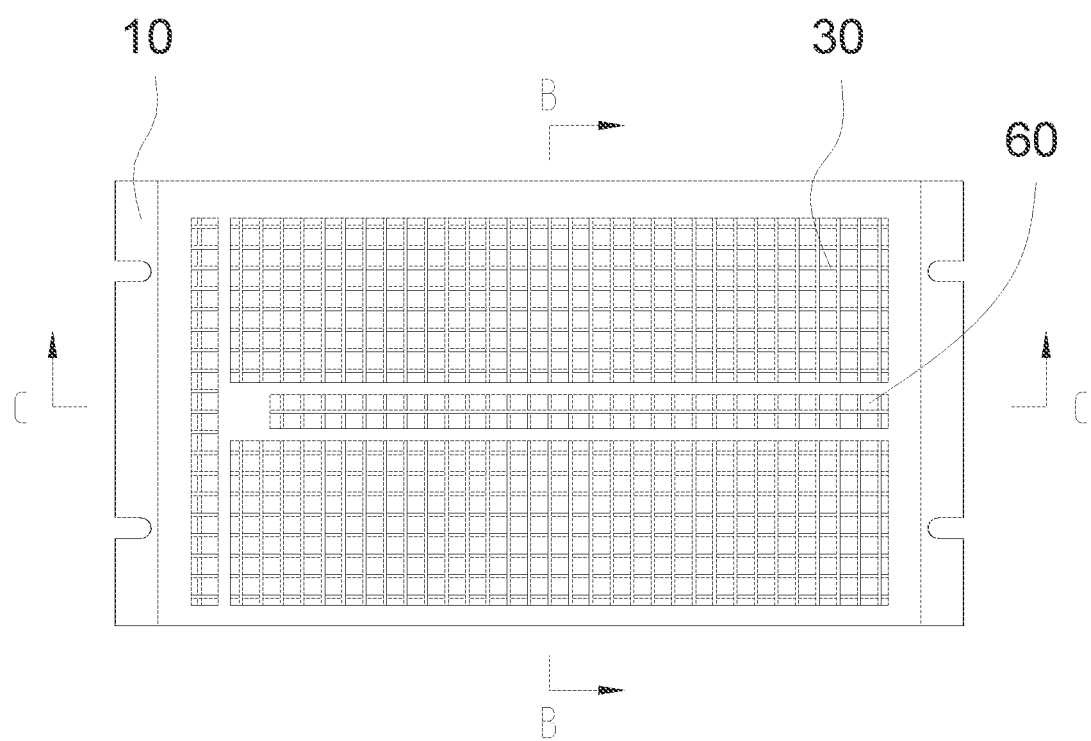
FIG. 5 is a top view of a filtering device according to a second embodiment of the present disclosure.
Figure 6:
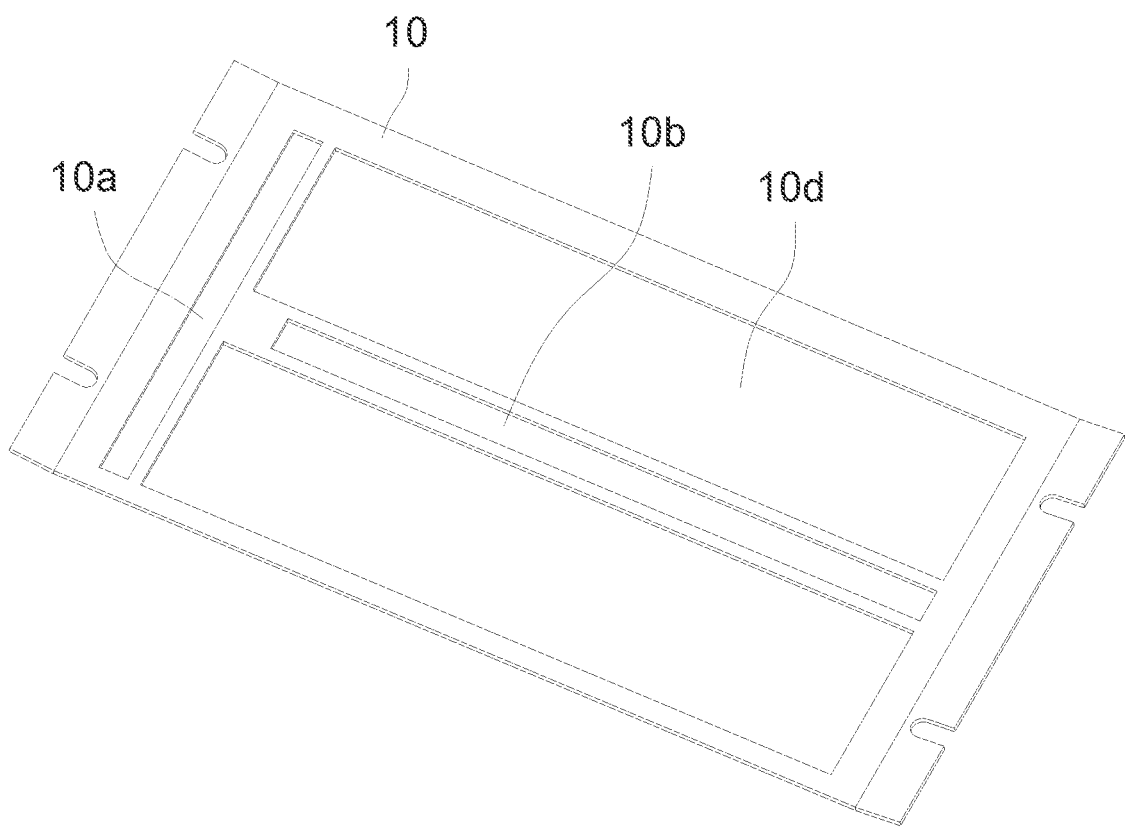
FIG. 6 is a perspective view of the load-bearing cover plate in FIG. 5.

As shown in FIGS. 5 and 6, the filter element 60 is flexible. The mounting port of the load-bearing cover plate includes the first mounting port 10a. The first mounting port 10a extends in the width direction of the load-bearing cover plate 10 and is located at one end of the load-bearing cover plate 10, and the mounting port of the load-bearing cover plate 10 further includes a filter element pushing hole 10b, which extends in the longitudinal direction of the load-bearing cover plate 10.

If the size of the filtering device is large, the mounting and removal process of the filter element 60 will have a long stroke, especially when the first mounting port 10a is provided at one lengthwise end of the load-bearing cover plate 10 longitudinal direction, the mounting and removal stroke of the filter element 60 is long. The filter element pushing hole 10b increases the force-exerting point on the load-bearing cover plate 10 for pushing the filter element 60, and the filter element pushing hole 10b is located on one side of the first mounting port 10a in the filter element pushing direction. The operator can take advantage of the cooperation of the filter element pushing hole 10b and the first mounting port 10a to make the mounting and removal of the filter element 60 easy and smooth.

In the process of mounting the filter element 60, the operator can coordinately push part of the filter element 60 close to the first mounting port 10a on the load-bearing cover plate 10 and part of the filter element 60 in the filter element pushing hole 10b on the load-bearing cover plate 10, which makes the mounting of the filter element 60 easier and can further reduce the occurrence of wrinkles of the flexible filter element in the accommodation space 70 of the filtering device.

In the process of removing the filter element 60, the part of the filter element 60 in the filter element pushing hole 10b can be reversely pushed through the filter element pushing hole 10b, so that the filter element 60 completely located in the accommodation space 70 of the filtering device can be easily pushed outside the first mounting port 10a on the load-bearing cover plate 10, or the filter element 60 is first partly removed, and the operator then applies force to the filter element 60 which has been removed out from the first mounting port 10a on the load-bearing cover plate 10 to complete the removal of the filter element 60.

The filter element pushing hole 10b may be arranged according to the relative position between the first mounting port 10a and the accommodation space 70 of the filtering device. For example, if the first mounting port 10a is close to one end of the accommodation space 70 in the filtering device, the filter element pushing hole 10b is located on the load-bearing cover plate 10 between the first mounting port 10a and the other end of the accommodation space 70 in the filtering device. If the first mounting port 10a is located between the two ends of the accommodation space 70 in the filtering device, then filter element pushing holes 10b are provided on the load-bearing cover plate 10 between the first mounting port 10a and one end of the accommodation space 70 in the filtering device and on the load-bearing cover plate 10 as well as the first mounting port 10a and the other end of the accommodation space 70 in the filtering device, so as to facilitate the pushing of the flexible filter element in different directions.

In some embodiments, the filter element pushing hole 10b may be in a regular shape such as a circle, a square, or a triangle, or may be in other irregular shape.

In some embodiments, the filter element pushing hole 10b may be substantially perpendicular to the first mounting port 10a, and covers the main portion of the load-bearing cover plate 10 in the longitudinal direction of the load-bearing cover plate 10. The filter element pushing hole 10b may be an elongated hole extending along the longitudinal direction of the filter element 60. On the one hand, the pushing stroke of the filter element pushing hole 10b is increased, and the pushing force received by the filter element 60 is more balanced, and the flexible filter element is more stretched in the accommodation space 70 of the filtering device. On the other hand, the opening area on the load-bearing cover plate 10 can be saved, and the rigidity loss of the load-bearing cover plate 10 can be reduced. In addition, by arranging the first mounting port 10a of the filter element 60 at one end of the load-bearing cover plate 10, the area of the load-bearing cover plate 10 can be further reduced, and load-bearing portions of the load-bearing cover plate 10 can be balanced, without affecting the load-bearing function of the load-bearing cover plate 10.

In some embodiments, as shown in FIG. 6, the load-bearing cover plate 10 further includes two hollow portions 10*d*, and the filter element pushing hole 10*b* is located between the two hollow portions 10*d*. The filter element pushing hole 10*b* may be provided in the middle of the load-bearing cover plate 10, and the hollow portions 10*d* with a large area are provided on two sides of the filter element pushing hole 10*b*. Each of the hollow portions 10*d* is an elongated hole extending in the longitudinal direction of the filter element 60, and the width dimension of each of the hollow portions 10*d* is larger than the width dimension of the filter element pushing hole 10*b*. The two hollow portions 10*d* may be axisymmetric with respect to the filter element pushing hole 10*b*. The length of the filter element pushing hole 10*b* is smaller than the length of the hollow portion 10*d*, or both ends of the filter element pushing hole 10*b* may be shorter than the corresponding ends of the hollow portion 10*d*, as long as the filter element 60 can be pushed to the entire length.

Figure 7:
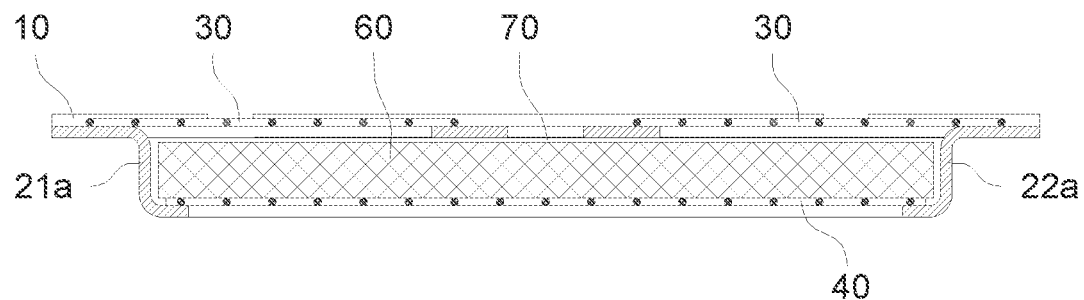
FIG. 7 is a schematic sectional view showing the structure of the filtering device of FIG. 5 taken along line B-B.

In some embodiments, the first filter screen structure 30 includes two parts, which are arranged respectively corresponding to the two hollow portions 10*d* and cover the upper surface of the filter element 60. That is, corresponding to the arrangement of the filter element pushing hole 10*b*, the first filter screen structure 30 may be configured as two first filter screens 30 corresponding to the two hollow portions 10*d*. The two first filter screen structures 30 respectively cover the two hollow portions 10*d*. The portion corresponding to the first mounting port 10*a* is not covered as shown in FIG. 7, so as to facilitate the insertion of the filter element 60 into the accommodation space 70 through the first mounting port 10*a*. This arrangement facilitates the removal and mounting of the filter element 60, can further reduce the area of the hollow portions 10*d* of the load-bearing cover plate 10, and is conducive to maintaining the strength of the load-bearing cover plate 10.

The inventor of the present disclosure considers that the enclosure plate 20 in the filtering device can provide a predetermined support for the second filter screen structure 40. An implementation manner of the filtering device according to the present disclosure is provided below.

As shown in FIG. 3, the enclosure plate 20 according to the embodiments of the present disclosure includes a bent portion 20*a*.

The bent portion 20*a* is located on a lower side of the enclosure plate 20 and at least partially covers the lower surface of the filter element 60.

Or, the bent portion 20*a* is located on an upper side of the enclosure plate 20 and is bent outward, and is connected to the load-bearing cover plate 10 and the first filter screen structure 30.

In some embodiments, the second filter screen structure 40 is fixedly connected to one side of the bent portion 20*a* close to the load-bearing cover plate 10, and the bent portion 20*a* can provide support for the second filter screen structure 40, which can reduce the strength requirements of the fixed connection between the second filter screen structure 40 and the enclosure plate 20.

In some embodiments, the second filter screen structure 40 is fixedly connected to an opening surface of the bent portion 20*a*, so that the second filter screen structure 40 and the bent portion 20*a* of the enclosure plate 20 can easily form a complete surface, which is conducive to the placement of the filter element 60.

In some embodiments, the second filter screen structure 40 is fixedly connected to one side of the bent portion 20*a* away from the load-bearing cover plate 10, so that the contact surface between the second filter screen structure 40 and the enclosure plate 20 is larger, and it is easier to connect the second filter screen structure 40 with the enclosure plate 20. For example, the second filter screen structure 40 may be connected with the enclosure plate 20 by adhesive. Since the second filter screen structure 40 is connected to the outside of the enclosure plate 20, the assembly accuracy requirement between the second filter screen structure 40 and the enclosure plate 20 is low, and the construction is simple, and the matching accuracy requirement between the size of the second filter screen structure 40 and the size of the enclosure plate 20 is low, thereby reducing the manufacturing cost.

In some embodiments, the enclosure plate 20 may be provided with bent portions 20*a* at opposite ends on a side away from the load-bearing cover plate 10 to cover part of the lower surface of the filter element 60. A passage for mounting the second filter screen structure 40 may be formed at one end portion of the enclosure plate where the bent portion 20*a* is not formed. It is also applicable that the enclosure plate 20 is provided with bent portions 20*a* in a circumferential direction on the side away from the load-bearing cover plate 10.

In some embodiments, the load-bearing cover plate 10 includes the hollow portion 10*d*. The load-bearing cover plate 10 is bent downward at an outer edge of the hollow portion 10*d* and then bent again to form part of the side wall of the accommodation space 70, and covers part of the lower surface of the filter element 60.

In this embodiment, as shown in FIG. 4, at least one of two outer edges in the longitudinal direction, of part of the load-bearing cover plate 10 forming the hollow portion 10*d* can be directly bent downward to form the enclosure plate 20 of the accommodation space 70 in the longitudinal direction, and can be bent again to form the bent portion 20*a* supporting the filter element 60 and the second filter screen structure 40. In this way, part of the enclosure plate 20 and the load-bearing cover plate 10 can be integrally formed to increase the overall load-bearing performance of the filtering device.

Optionally, the two lengthwise ends of the load-bearing cover plate 10 longitudinal direction may be configured as a slightly inclined mounting portion, and the mounting portion is provided with a mounting structure for mounting the filtering device to a flow passage port. For example, the mounting structure may be a structure with an opening.

Figure 8:
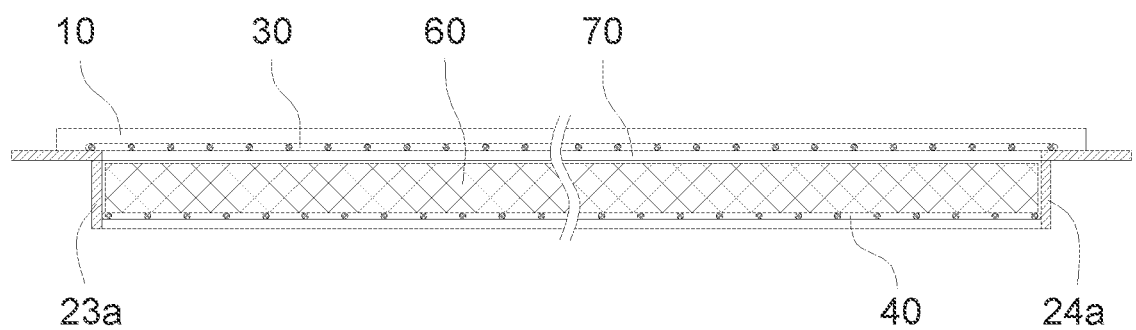
FIG. 8 is a schematic sectional view showing the structure of the filtering device of FIG. 5 taken along line C-C.

In some embodiments, as shown in FIGS. 7 and 8, the enclosure plate 20 forms four at least sidewall portions of the accommodation space. An upper edge of the enclosure plate 20 includes four bent portions to support the load-bearing cover plate 10, and the lower edges of at least two sides include the bent portions to support the second filter screen structure 40 and the filter element 60. The enclosure plate 20 includes a first inner crimping 21*a*, a second inner crimping 22*a*, a first sealing edge 23*a*, and a second sealing edge 24*a*. The first inner crimping 21*a* and the second inner crimping 22*a* are formed by bending and extending downwards two opposite edges of the enclosure plate at the outer side of the hollow portion 10*d* of the load-bearing cover plate 10, and bending again. Two ends of the first sealing edge 23*a* are respectively connected to one end of the first inner crimping 21*a* and one end of the second inner crimping 22*a*. Two ends of the second sealing edge 24*a* are respectively connected to the other end of the first inner crimping 21a and the other end of the second inner crimping 22a. Thus, the enclosure plate 20 may be integrally formed to provide the accommodation space 70 with a predetermined rigidity in the thickness direction.

In this embodiment, the first inner crimping 21a and the second inner crimping 22a may be formed by cutting and bending the load-bearing cover plate 10 at the hollow portion 10d of the load-bearing cover plate 10, that is, the first inner crimping 21a and the second inner crimping 22a are a part of the load-bearing cover plate 10, which can reduce the waste of materials. The first inner crimping 21a and the second inner crimping 22a have the same strength as the load-bearing cover plate 10. The first sealing edge 23a and the second sealing edge 24a are configured to seal openings at two ends of the first inner crimping 21a and the second inner crimping 22a, so that the first inner crimping 21a, the second inner crimping 22a, the first sealing edge 23a, the second sealing edge 24a, the load-bearing cover plate 10, the first filter screen structure 30 and the second filter screen structure 40 on the load-bearing cover plate 10 together define the accommodation space 70 for accommodating the filter element 60.

The inventor of the present disclosure considers that, in a case that, for example, the size of the filtering device is large, the load-bearing cover plate 10 does not need to have the same size as the entire filtering device, and if the load-bearing cover plate 10 is optimized, the cost can be reduced. An implementation manner of the filtering device according to the present disclosure is provided below.

Figure 9:
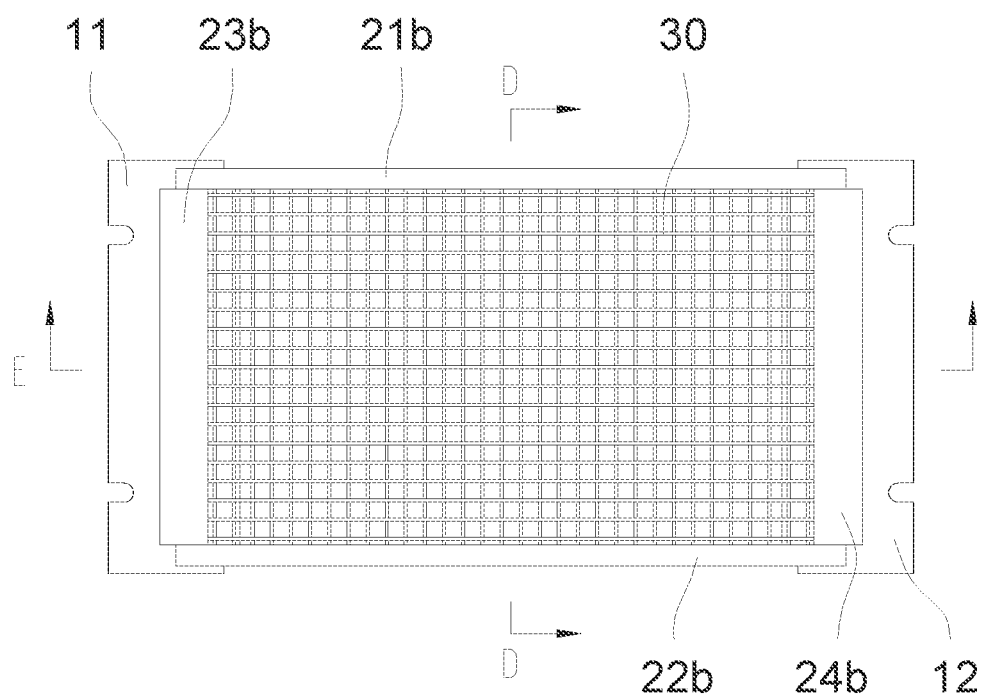
FIG. 9 is a top view of a filtering device according to a third embodiment of the present disclosure.

As shown in FIG. 9, the load-bearing cover plate 10 of this embodiment according to the present disclosure includes a first cover plate 11 and a second cover plate 12.

The first cover plate 11 and the second cover plate 12 are respectively located at two lengthwise ends of the filter element 60 longitudinal direction, and are located below the lower surface of the filter element 60.

In this embodiment, the load-bearing cover plate 10 has an independent structure, the first cover plate 11 and the second cover plate 12 may be arranged at required positions of the generator, so as to provide an operation region that can carry the operator and related tools, that is, the load-bearing cover plate 10 only covers the operation region, which can save the material cost of the load-bearing cover plate 10.

On the basis of the above embodiments, an implementation manner of the filtering device according to the present disclosure is provided below.

Figure 10:
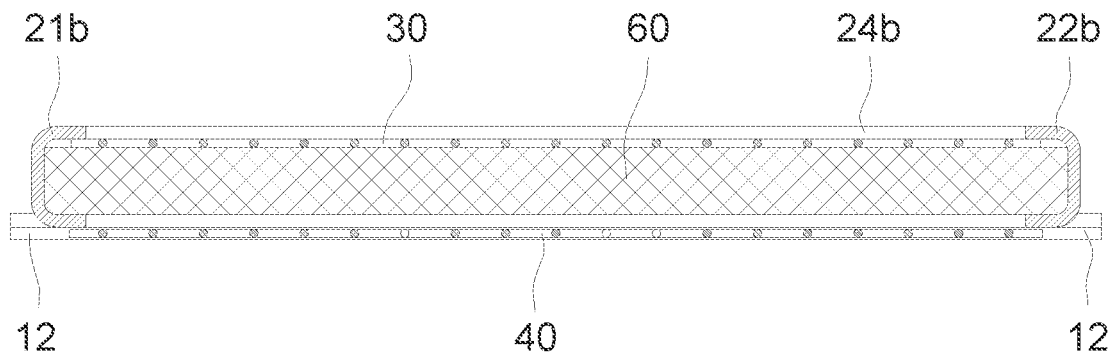
FIG. 10 is a schematic sectional view showing the structure of the filtering device of FIG. 9 taken along line D-D.

As shown in FIGS. 9 and 10, the enclosure plate 20 according to the embodiment of the present disclosure includes a first support plate 21b and a second support plate 22b, which extend in the longitudinal direction of the filter element 60, and a first baffle 23b and a second baffle 24b, which extend in the width direction of the filter element 60.

The cross section of the first support plate 21b and the cross section of the second support plate 22b in the longitudinal direction of the filter element 60 are of a C-shape, and the first baffle 23b and the second baffle 24b partially cover the upper surface of the filter element 60.

In this embodiment, the first cover plate 11 and the second cover plate 12 are respectively located at two lengthwise ends of the accommodation space 70 longitudinal direction. The first support plate 21b and the second support plate 22b extend in the length of the accommodation space 70. The first baffle 23b and the second baffle 24b are located at two lengthwise ends of the accommodation space 70 longitudinal direction, and are respectively connected to the first support plate 21b and the second support plate 22b.

The cross section of the first support plate 21b and the cross section of the second support plate 22b are of a C-shape in an axial direction of the accommodation space 70, that is, the enclosure plate 20 includes bent portions that at least partially cover the upper and lower surfaces of the filter element 60. The first support plate 21b and the second support plate 22b are opposite to each other. In this case, the accommodation space 70 is mainly formed by the enclosure plate 20, and the load-bearing cover plate 10 is arranged at the bottom of the accommodation space 70 to support the enclosure plate 20. The exposed portion of the upper surface of the filter element 60 is covered and protected by the first filter screen structure 30, and the exposed portion of the lower surface of the filter element 60 is covered and protected by the second filter screen structure 40.

As shown in FIG. 10, the cross section of the first support plate 21b and the cross section of the second support plate 22b are of a C-shape in the axial direction of the accommodation space 70. On the one hand, the connection area between the two support plates and the corresponding cover plates and baffles on two sides is increased, which is conducive to improving the stability of the connection, and on the other hand, a predetermined support or restraint for the first filter screen structure 30, or the second filter screen structure 40, or the filter element 60 can be provided.

The first cover plate 11 and the second cover plate 12 are fixedly connected to two ends, on a same side, of the first support plate 21b and the second support plate 22b, respectively, and are located below the first support plate 21b and the second support plate 22b, so as to support the first support plate 21b and the second support plate 22b.

The first baffle 23b and the second baffle 24b are fixedly connected to two ends, on the other side, of the first support plate 21b and the second support plate 22b, respectively, and are substantially bent, and partially cover a side wall surface and the upper surface of the filter element 60, respectively. New mounting ports for mounting the filter element 60 may be formed between the first baffle 23b and the first cover plate 11 as well as between the second baffle 24b and the second cover plate 12, which may be further referred to the detailed description below.

Figure 11:
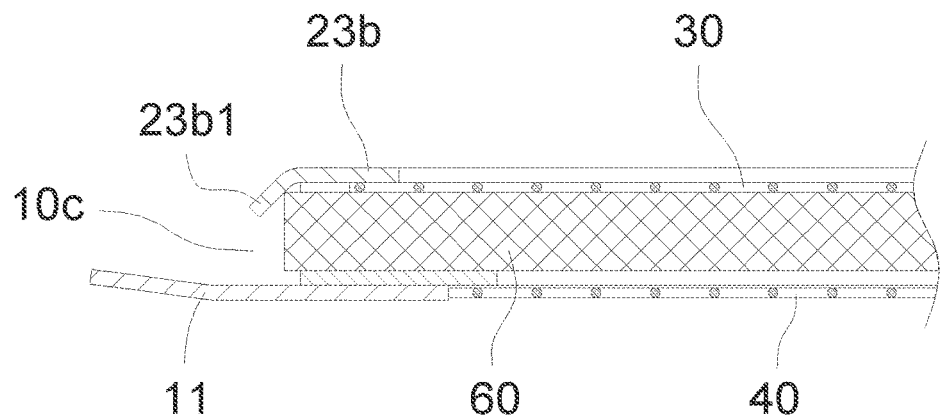
FIG. 11 is a schematic sectional view showing the structure of the filtering device of FIG. 9 taken along line E-E.

In some embodiments, as shown in FIG. 11, the first baffle 23b and/or the second baffle 24b has a crimping 23b1 that is bent toward the first cover plate 11, and a second mounting port 10c for mounting the filter element 60 is formed between the crimping 23b1 and the corresponding cover plate.

In this embodiment, the second mounting port 10c is formed between the first baffle 23b and the first cover plate 11, which is configured to remove and mount the filter element 60 in the accommodation space 70 of the filtering device, and the crimping 23b1 on the first baffle 23b bent toward the first cover plate 11 can form a predetermined unidirectional constraint on the second mounting port 10c. The filter element 60 may be pushed into the accommodation space 70 of the filtering device through the second mounting port 10c. After the filter element 60 has completely entered the accommodation space 70, the crimping 23b1 on the first cover plate 11 prevents the filter element 60 from sliding out, thereby realizing the constraint on the filter element 60, and preventing the filter element 60 from slipping out of the filtering device.

A third mounting port and a crimping on the second cover plate 12 are formed between the second baffle 24b and the second cover plate 12, which has same functions and beneficial effects as the above content and will not be repeated here.

The inventor of the present disclosure considers that the first filter structure 30 provided on the load-bearing cover plate 10 may adopt different implementation structures according to different usage requirements. An implementation manner of the filtering device according to the present disclosure is provided below.

Figure 12:
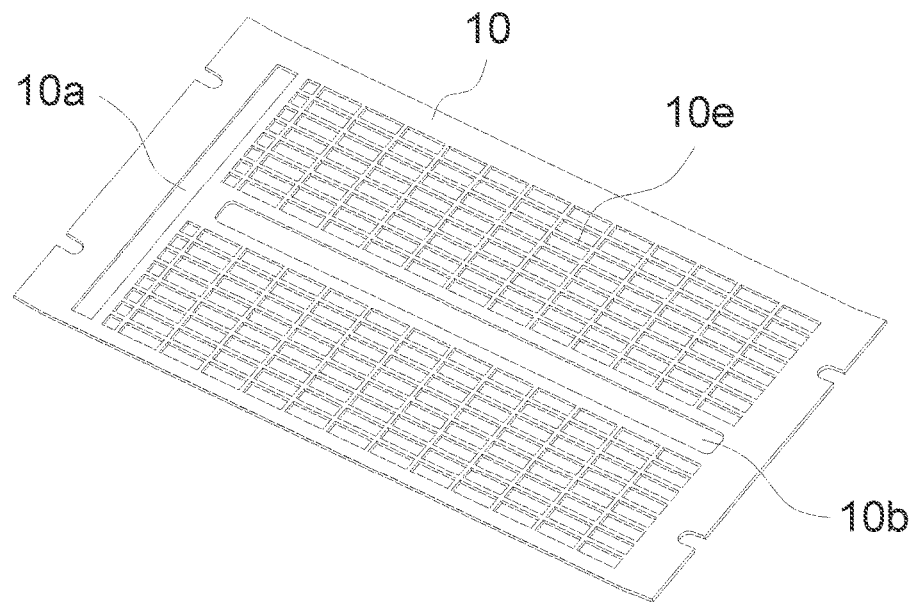
FIG. 12 is a perspective view of a load-bearing cover plate of a filtering device according to a fourth embodiment of the present disclosure.

As shown in FIG. 12, the load-bearing cover plate 10 according to the embodiment of the present disclosure includes multiple filter screen openings 10e, and part of the load-bearing cover plate 10 with the multiple filter screen openings 10e forms the first filter screen structure 30.

In this embodiment, the multiple filter screen openings 10e are directly processed on the load-bearing cover plate 10, for example, by stamping, so as to form the first filter screen structure 30. The strength of the first filter screen structure 30 is high, and the filter screen region can carry the operator and related tools, which increases the operation region available to the operator. Moreover, the number of assembly parts of the filtering device can be reduced, and the structure of the filtering device can be simplified.

In some embodiments, the first filter structure 30 is a mesh filter, and matches with the hollow portions 10d of the load-bearing cover plate 10, and is arranged at the hollow portions 10d of the load-bearing cover plate 10 to protect the filter element 60 exposed at the hollow portions 10d. Therefore, the first filter screen structure 30 may be formed by a combination of multiple small filter screen structures, which are respectively arranged at the multiple hollow portions 10d of the load-bearing cover plate 10. The hollow portions 10d on the load-bearing cover plate 10 are used for ventilation, and the first filter screen structure 30 adopts the filter screen to reduce the cost. Optionally, the filter screen may be a woven filter screen or a welded filter screen.

In some embodiments, the second filter screen structure 40 may be a steel screen, a woven filter screen, or a welded filter screen. These structures are much lower in cost than the structure with punched holes, thereby reducing the cost of the filtering device.

The inventor of the present disclosure considers that, in the above embodiments, the second filter screen structure 40 is connected to the enclosure plate 20, and if the rigidity of the second filter screen structure 40 is poor, the overall stability of the filtering device may be adversely affected. For this, an implementation manner of the filtering device according to the present disclosure is provided below.

Figure 13:
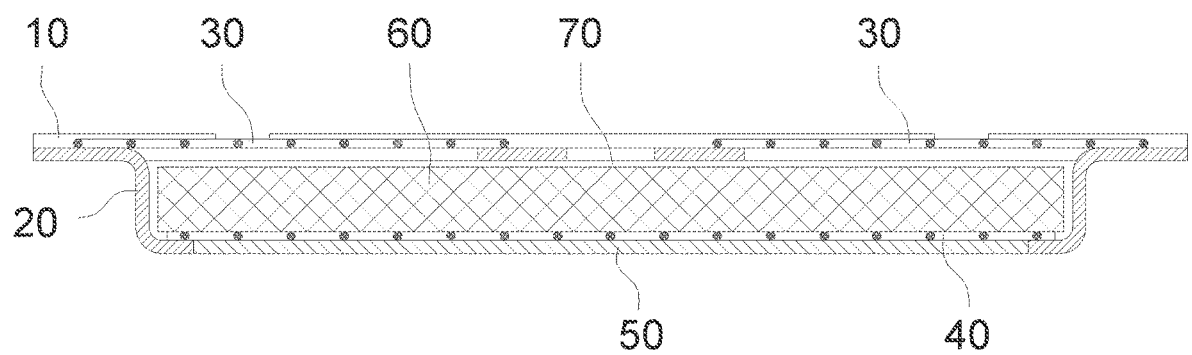
FIG. 13 is another schematic sectional view showing the structure of the filtering device of FIG. 1 taken along line A-A.

As shown in FIG. 13, the filtering device according to the embodiment of the present disclosure further includes a bottom plate 50. The bottom plate 50 is arranged below the lower surface of the filter element 60 and located outside the second filter screen structure 40.

In this embodiment, the bottom plate 50 is fixedly connected to a side of the enclosure plate 20 that is connected to the second filter screen structure 40, and is arranged below the second filter screen structure 40, that is, one side of the second filter screen structure 40 away from the load-bearing cover plate 10 is in contact with the bottom plate 50. The bottom plate 50 may have various structural forms without affecting the flow of fluid, for example, the bottom plate may include hollow portions, filter screen openings, and so on. The bottom plate 50 can provide more support for the second filter screen structure 40, which is conducive to strengthening the overall stability of the filtering device.

In some embodiments, the second filter screen structure 40 may be fixedly connected to the bottom plate 50, or the second filter screen structure 40 may just be placed on the bottom plate 50.

Based on a same inventive concept, a generator is provided according to the embodiments of the present disclosure, which includes a generator housing with built-in rotor and stator. The generator housing has an air inlet for heat dissipation, and the filtering device according to any one of the above embodiments is provided at the air inlet.

The generator according to this embodiment realizes heat dissipation through the air inlet of the generator housing. The filtering device according to the present disclosure is provided at the air inlet. Through the filter structure supported by the double-layer filter screen and matched with the filter element 60, the filter performance in the air cooling process is enhanced, and the internal environment of the generator is thereby cleaner.

The load-bearing cover plate 10 in the filtering device provides an operation region on the generator that can carry the operator and related tools. The Operator can perform operation and maintenance taking advantage of the height of the generator, reducing the types of tools required for operation and maintenance, and reducing the burden on the operators. Besides, only the rigidity of the load-bearing cover plate 10 is required to meet the load-bearing requirements, and there is no need to increase the rigidity of the entire generator housing, which reduces the cost.

In some embodiments, the load-bearing cover plate 10 of the filtering device is connected to a load-bearing beam of the generator.

Based on a same inventive concept, a wind turbine generator system is provided according to the embodiments of the present disclosure, which includes the filtering device according to any one of the above embodiments, or the generator according to any one of the above embodiments.

In summary, the embodiments of the present disclosure have at least the following beneficial effects.

1. In the filtering device according to the above embodiments, the load-bearing cover plate 10 is used for providing an operation region on the generator that can carry the operators and related tools. The Operator can perform operation and maintenance taking advantage of the height of the generator, reducing the types of tools required for operation and maintenance, and reducing the burden on the operators. Besides, only the rigidity of the load-bearing cover plate 10 is required to meet the load-bearing requirements, and there is no need to increase the rigidity of the entire generator housing, which reduces the cost.

2. In the filtering device according to the above embodiments, the filter structure supported by a double-layer filter screen and matched with the filter element 60 forms a reliable and simple-structure filter at the generator cooling air inlet, ensuring the IP level inside the generator, which is easy to operate and maintain.

3. The filter element 60 is flexible, and the load-bearing cover plate 10 has the first mounting port 10a. The first mounting port 10a facilitates the removal and mounting of the filter element 60. The flexible filter element can be well adapted to the removal and mounting of the first mounting port 10a.

4. The load-bearing cover plate 10 further has the filter element pushing hole 10b. The filter element pushing hole 10b increases the force-exerting point on the load-bearing cover plate 10 for pushing the filter element 60, and the filter element pushing hole 10b is located on one side of the first mounting port 10a in the filter element pushing direction. The operator can take advantage of the cooperation of the filter element pushing hole 10b and the first mounting port 10a to make the mounting and removal of the filter element 60 easy and smooth.

5. The filter element pushing hole 10b has an elongated hole structure, and the longitudinal direction of the elongated hole is parallel or substantially parallel to the filter element pushing direction. On the one hand, the pushing stroke of the filter element pushing hole 10b is increased, and the pushing force received by the filter element 60 is more balanced, and the flexible filter element is more stretched in the accommodation space 70 of the filtering device. On the other hand, the opening area on the load-bearing cover plate 10 can be saved, and the rigidity loss of the load-bearing cover plate 10 can be reduced.

6. The enclosure plate 20 includes the first inner crimping 21a, the second inner crimping 22a, the first sealing edge 23a, and the second sealing edge 24a. The first inner crimping 21a and the second inner crimping 22a may be formed by cutting and bending the load-bearing cover plate 10 at the hollow portion 10d of the load-bearing cover plate 10, that is, the first inner crimping 21a and the second inner crimping 22a are a part of the load-bearing cover plate 10, which can reduce the waste of materials. The first inner crimping 21a and the second inner crimping 22a have the same strength as the load-bearing cover plate 10. The first sealing edge 23a and the second sealing edge 24a are configured to seal openings at two ends of the first inner crimping 21a and the second inner crimping 22a, so that the first inner crimping 21a, the second inner crimping 22a, the first sealing edge 23a, the second sealing edge 24a, the load-bearing cover plate 10, the first filter screen structure 30 and the second filter screen structure 40 on the load-bearing cover plate 10 together define the accommodation space 70 for accommodating the filter element 60.

7. The load-bearing cover plate 10 may include the first cover plate 11 and the second cover plate 12. The enclosure plate 20 may include the first support plate 21b, the second support plate 22b, the first baffle 23b, and the second baffle 24b. In this embodiment, the load-bearing cover plate 10 has an independent structure, the first cover plate 11 and the second cover plate 12 may be arranged at required positions of the generator, so as to provide an operation region that can carry the operator and related tools, that is, the load-bearing cover plate 10 only covers the operation region, which can save the material cost of the load-bearing cover plate 10. The cross section of the first support plate 21b and the cross section of the second support plate 22b are of a C-shape in the axial direction of the accommodation space 70. On the one hand, the connection area between the two support plates and the corresponding cover plates and baffles on two sides is increased, which is conducive to improving the stability of the connection, and on the other hand, a predetermined support or restraint for the first filter screen structure 30, or the second filter screen structure 40, or the filter element 60 can be provided.

8. The second mounting port 10c is formed between the first baffle 23b and the first cover plate 11, which is configured to remove and mount the filter element 60 in the accommodation space 70 of the filtering device, and the crimping 23b1 on the first baffle 23b bent toward the first cover plate 11 can form a predetermined unidirectional constraint on the second mounting port 10c. The filter element 60 may be pushed into the accommodation space 70 of the filtering device through the second mounting port 10c. After the filter element 60 has completely entered the accommodation space 70, the crimping 23b1 on the first cover plate 11 prevents the filter element 60 from sliding out, thereby realizing the constraint on the filter element 60, and preventing the filter element 60 from slipping out of the filtering device.

9. The first filter screen structure 30 adopts filter screens, which can reduce the cost.

10. The multiple filter screen openings 10e are directly processed on the load-bearing cover plate 10, for example, by stamping, so as to form the first filter screen structure 30. The strength of the first filter screen structure 30 is high, and the filter screen region can carry the operator and related tools, which increases the operation region available to the operator.

Those skilled in the art should understand that the steps, measures, and solutions in the various operations, methods, and processes that have been discussed in this application can be alternated, modified, combined, or deleted. Furthermore, other steps, measures, and solutions in the various operations, methods, and processes that have been discussed in this application can also be alternated, modified, combined, or deleted. Furthermore, the steps, measures, and solutions in the various operations, methods, and processes of this application which have already existed in the conventional technology can also be alternated, modified, combined, or deleted.

In the description of the present application, it should be noted that the orientation or positional relationship indicated by the terms, such as "central", "upper", "lower", "front", "rear", "left", "right", "vertical", "horizontal", "top", "bottom", "inner", and "outer", are based on the orientation or positional relationship shown in the drawings, which are only to facilitate the description of the present application and to simplify the description, rather than indicating or implying that the device or element referred to must have a specific orientation, or can only be configured and operated in a particular orientation. Therefore the above-mentioned terms should not be construed as a limitation to the present application.

The terms "first", "second" and the like are for purpose of description, and should not be interpreted as indicating or implying relative importance or implying the number of the indicated technical features. Thus, the features defined by "first", "second" and the like can express or impliedly include one or more the features. In the present application, the word "multiple" indicates two or more unless otherwise specified.

In a description of the present application, it should be further noted that, unless otherwise explicitly specified and defined, terms such as "mounting", "link" and "connection" should be understood in a broad sense, for example, the terms may imply a fixed connection, a detachable connection, or an integral connection; a direct connection, an indirect connection through an intermediate medium, or an internal communication between two components. For those skilled in the art, the specific meaning of the above terms in the present application may be understood in the light of specific circumstances.

In the description of this specification, specific features, structures, materials or characteristics may be combined in any one or more embodiments or examples in a suitable manner.

Those described above are only some embodiments of the present application. It should be noted that, for those skilled in the art, improvements and modifications may also be made without departing from the principle of the application. These improvements and modifications should also be included in the scope of protection of the present application.

The invention claimed is:
1. A filtering device, comprising:
a load-bearing cover plate;

an enclosure plate;
a first filter screen structure;
a second filter screen structure; and
a filter element;
wherein the load-bearing cover plate and the enclosure plate define an accommodation space to be filled by the filter element, wherein the enclosure plate forms at least part of a side wall of the accommodation space;
wherein the first filter screen structure is arranged above the filter element;
wherein the second filter screen structure is arranged below the filter element, and covers a lower surface of the filter element; and
wherein a mounting port for the filter element to pass through is provided in the load-bearing cover plate.

2. The filtering device according to claim 1, wherein the filter element is flexible; and the mounting port of the load-bearing cover plate comprises a first mounting port, which extends in a longitudinal direction of the load-bearing cover plate.

3. The filtering device according to claim 2, wherein the load-bearing cover plate further comprises two hollow portions, and the first mounting port is arranged between the two hollow portions.

4. The filtering device according to claim 1, wherein the filter element is flexible; and the mounting port of the load-bearing cover plate comprises a first mounting port, which extends in a width direction of the load-bearing cover plate and is located at one end of the load-bearing cover plate, and the mounting port of the load-bearing cover plate further comprises a filter element pushing hole, which extends in a longitudinal direction of the load-bearing cover plate.

5. The filtering device according to claim 4, wherein the load-bearing cover plate further comprises two hollow portions, and the filter element pushing hole is arranged between the two hollow portions.

6. The filtering device according to claim 3, wherein the first filter screen structure comprises two parts, which are respectively provided corresponding to the two hollow portions and cover the upper surface of the filter element.

7. The filtering device according to claim 1, wherein the enclosure plate comprises a first bent portion, and
wherein the first bent portion is located on a lower side of the enclosure plate and at least partially covers the lower surface of the filter element.

8. The filtering device according to claim 1, wherein the load-bearing cover plate comprises a hollow portion, the load-bearing cover plate is bent downward at an outer edge of the hollow portion and then bent again to form part of a side wall of the accommodation space, and covers part of the lower surface of the filter element.

9. The filtering device according to claim 1, wherein the load-bearing cover plate comprises a first cover plate and a second cover plate; and
the first cover plate and the second cover plate are respectively located at two lengthwise ends of a filter element longitudinal direction, and are located below the lower surface of the filter element.

10. The filtering device according to claim 9, wherein the enclosure plate comprises a first support plate and a second support plate which extend in the longitudinal direction of the filter element, and a first baffle and a second baffle which extend in a width direction of the filter element; and
a cross section of the first support plate and a cross section of the second support plate in the longitudinal direction of the filter element are of a C-shape, and the first baffle and the second baffle partially cover the upper surface of the filter element.

11. The filtering device according to claim 10, wherein the first baffle or the second baffle has a crimping that is bent toward the first cover plate, and a second mounting port for mounting the filter element is formed between the crimping and the first cover plate.

12. The filtering device according to claim 1, wherein the load-bearing cover plate comprises a plurality of filter screen openings, and part of the load-bearing cover plate with the plurality of filter screen openings forms the first filter screen structure.

13. The filtering device according to claim 1, wherein the filtering device further comprises a bottom plate, which is arranged below the lower surface of the filter element and located outside the second filter screen structure.

14. The filtering device according to claim 1, wherein the enclosure plate comprises a second bent portion, and
wherein the second bent portion is located on an upper side of the enclosure plate and is bent outward, and is connected to the load-bearing cover plate and the first filter screen structure.

15. A generator, comprising:
a generator housing with a built-in rotor and a built-in stator, wherein the generator housing has an air inlet for heat dissipation; and
a filtering device provided at the air inlet, wherein the filtering device comprises:
a load-bearing cover plate;
an enclosure plate;
a first filter screen structure;
a second filter screen structure; and
a filter element;
wherein the load-bearing cover plate and the enclosure plate define an accommodation space to be filled by the filter element, wherein the enclosure plate forms at least part of a side wall of the accommodation space;
wherein the first filter screen structure is arranged above the filter element;
wherein the second filter screen structure is arranged below the filter element, and covers a lower surface of the filter element; and
wherein a mounting port for the filter element to pass through is provided in the load-bearing cover plate.

16. A wind turbine generator system, comprising the generator according to claim 15.

17. The generator according to claim 15, wherein the filter element is flexible, and
wherein the mounting port of the load-bearing cover plate comprises a first mounting port, which extends in a longitudinal direction of the load-bearing cover plate.

18. The generator according to claim 17, wherein the load-bearing cover plate further comprises two hollow portions, and the first mounting port is arranged between the two hollow portions.

19. The generator according to claim 15, wherein the filter element is flexible; and the mounting port of the load-bearing cover plate comprises a first mounting port, which extends in a width direction of the load-bearing cover plate and is located at one end of the load-bearing cover plate, and the mounting port of the load-bearing cover plate further comprises a filter element pushing hole, which extends in a longitudinal direction of the load-bearing cover plate.

20. A wind turbine generator system, comprising:
a generator housing having an air inlet; and a filtering device provided at the air inlet, wherein the filtering device comprises:
a load-bearing cover plate;
an enclosure plate;
a first filter screen structure;
a second filter screen structure; and
a filter element;
wherein the load-bearing cover plate and the enclosure plate define an accommodation space to be filled by the filter element, wherein the enclosure plate forms at least part of a side wall of the accommodation space;
wherein the first filter screen structure is arranged above the filter element;
wherein the second filter screen structure is arranged below the filter element, and covers a lower surface of the filter element; and
wherein a mounting port for the filter element to pass through is provided in the load-bearing cover plate.

\* \* \* \* \*